United States Patent
Köhler et al.

(10) Patent No.: US 7,869,359 B2
(45) Date of Patent: Jan. 11, 2011

(54) METHOD AND SYSTEM FOR CONTROLLING DATA TRAFFIC IN A NETWORK

(76) Inventors: Stefan Köhler, Sandstrasse 1, Gerbrunn (DE) 97218; Dirk Staehle, Auf der Schanz 50, Würzburg (DE) 97076; Ute Kohlhaas, Nürnberger Strasse 18, Falkensee (DE) 14612; Phuoc Tran-Gia, Josef-Seitz-Strasse 49, Würzburg (DE) 97076

( * ) Notice: Subject to any disclaimer, the term of this patent is extended or adjusted under 35 U.S.C. 154(b) by 1278 days.

(21) Appl. No.: 10/221,427

(22) PCT Filed: Mar. 15, 2001

(86) PCT No.: PCT/EP01/02965
§ 371 (c)(1), (2), (4) Date: Dec. 23, 2002

(87) PCT Pub. No.: WO01/69866
PCT Pub. Date: Sep. 20, 2001

(65) Prior Publication Data
US 2003/0185153 A1   Oct. 2, 2003

(30) Foreign Application Priority Data
Mar. 15, 2000 (WO) .................... PCT/EP00/02289

(51) Int. Cl.
*H04L 12/26* (2006.01)
*H04J 3/14* (2006.01)
*G06F 15/173* (2006.01)

(52) U.S. Cl. ............ 370/231; 370/238; 370/252; 709/241

(58) Field of Classification Search ............ 370/223, 370/225, 229, 238, 231, 252; 709/241
See application file for complete search history.

(56) References Cited

U.S. PATENT DOCUMENTS

| 4,736,363 A |   | 4/1988 | Aubin et al. |
| 4,756,019 A |   | 7/1988 | Szybicki |
| 4,811,337 A |   | 3/1989 | Hart |
| 5,233,604 A | * | 8/1993 | Ahmadi et al. ............ 370/238 |
| 5,459,667 A | * | 10/1995 | Odagaki et al. ............ 701/209 |

(Continued)

FOREIGN PATENT DOCUMENTS

EP     0 275 678 A1     7/1988

(Continued)

OTHER PUBLICATIONS

Lee, Y. and Tien, J.M., "Strategic Parameter-Driven Routing Models for Multi-Destination Traffic in Telecommunication Networks," *IEEE International Conference on Systems, Man and Cybernetics*, pp. 3325-3330, Oct. 12, 1997.

(Continued)

*Primary Examiner*—Alpus H Hsu
(74) *Attorney, Agent, or Firm*—Sterne, Kessler, Goldstein & Fox P.L.L.C.

(57) ABSTRACT

A method and a system for optimizing the routing of data to be communicated in a network. In one embodiment, the system achieves an improved control for routing of data traffic in a network by minimizing link costs between nodes of the network.

53 Claims, 8 Drawing Sheets

U.S. PATENT DOCUMENTS

| | | | |
|---|---|---|---|
| 5,485,455 A | | 1/1996 | Dobbins et al. |
| 5,537,394 A | | 7/1996 | Abe et al. |
| 5,596,719 A | | 1/1997 | Ramakrishnan et al. |
| 5,608,645 A | * | 3/1997 | Spyrou ............................ 716/6 |
| 5,854,903 A | * | 12/1998 | Morrison et al. ............. 709/249 |
| 5,881,243 A | * | 3/1999 | Zaumen et al. ............... 709/241 |
| 5,970,050 A | * | 10/1999 | Johnson ....................... 370/238 |
| 6,016,306 A | | 1/2000 | Le Boudec et al. |
| 6,044,075 A | * | 3/2000 | Le Boudec et al. ........... 370/351 |
| 6,141,325 A | * | 10/2000 | Gerstel ......................... 370/238 |
| 6,201,810 B1 | * | 3/2001 | Masuda et al. .......... 370/395.32 |
| 6,363,319 B1 | * | 3/2002 | Hsu ............................. 701/202 |
| 6,370,119 B1 | * | 4/2002 | Basso et al. .................. 370/252 |
| 6,377,543 B1 | * | 4/2002 | Grover et al. ................. 370/227 |
| 6,404,735 B1 | | 6/2002 | Beshai et al. |
| 6,411,946 B1 | * | 6/2002 | Chaudhuri .................... 706/21 |
| 6,584,071 B1 | * | 6/2003 | Kodialam et al. ............. 370/238 |
| 6,633,544 B1 | | 10/2003 | Rexford et al. |
| 6,658,479 B1 | * | 12/2003 | Zaumen et al. ............... 709/238 |
| 6,697,333 B1 | * | 2/2004 | Bawa et al. ................... 370/238 |
| 6,718,177 B1 | * | 4/2004 | Comer et al. ................. 455/458 |
| 6,724,722 B1 | | 4/2004 | Wang et al. |
| 6,829,220 B1 | * | 12/2004 | Thorup et al. ................. 370/235 |
| 6,894,978 B1 | | 5/2005 | Hashimoto |
| 7,185,104 B1 | * | 2/2007 | Thorup et al. ................. 709/235 |
| 7,280,526 B2 | * | 10/2007 | Fleischer et al. ............. 370/351 |

FOREIGN PATENT DOCUMENTS

| | | |
|---|---|---|
| EP | 0 348 328 A2 | 12/1989 |
| EP | 0 465 090 A1 | 1/1992 |
| EP | 0 753 952 A2 | 1/1997 |
| JP | 06-343080 | 12/1994 |
| JP | 09-083546 | 3/1997 |
| JP | 09-191322 | 7/1997 |
| JP | 2000-049862 | 2/2000 |
| WO | WO-98/58474 A1 | 12/1998 |

OTHER PUBLICATIONS

Lin, F.Y.S. and Wang, J.L., "A Minimax Utilization Routing Algorithm in Networks with Single-path Routing," *IEEE Global Telecommunications Conference*, vol. 2 of 4, pp. 1067-1071, Nov. 29, 1993.

International Search Report from PCT Application No. PCT/EP/02289, 3 pages, mailed Nov. 29, 2000.

European Search Report from EP Publication No. 0 465 090 A1, completed Sep. 17, 1991.

GLOBECOM '82, Dec. 1982, New York, US. pp. 559-564; J. Kao et al.: 'Comparative evaluation of path routing strategies for mixed voice and data communication network.' p. 560.

INFOCOM '90, Jun. 1990, New York, US. pp. 481-486; G.E. Meyers et al.: 'Routing in TAC—a triangularly arranged network.' p. 483.

International Search Report from WO 98/58474, completed Oct. 12, 1998, mailed Oct. 22, 1998.

Lee, W. C. et al.: "Routing Subject to Quality of Service Constraints in Integrated Communication Networks," IEEE Network: The Magazine of Computer Communications, vol. 9, No. 4, Jul. 1, 1995, pp. 46-55.

Marin, G.A. et al.: "Overview of the NBBS Architecture," IBM Systems Journal, vol. 34, No. 4, Sep. 21, 1995, pp. 564-588.

Roche La H. J. et al: "High-speed data services using the switched digital broadband access system," Bell Labs Technical Journal, vol. 2, No. 2, Mar. 21, 1997, pp. 188-202.

Rodriguez-Moral, A.: "Libra—an Integrated Framework for Type of Service-Based Adaptive Routing in the Internet and Intranets," Bell Labs Technical Journal, vol. 2, No. 2, Mar. 21, 1997, pp. 42-67.

English language abstract of Japanese Patent Publication No. 09-191322, titled "Data Exchange Route Selection," 1 pg, Publication date—Jul. 22, 1997.

English language abstract of Japanese Patent Publication No. 06-343080, titled "System for Deciding Route in Searching Autonomic Distributed Path Setting Route," 1 pg, Publication Date—Dec. 13, 1994.

English language abstract of Japanese Patent Publication No. 2000-049862, titled "Route Selection System for Packet Communication Network," 1 pg. Publication Date—Feb. 18, 2000.

English language abstract of Japanese Patent Publication No. 09-083546, titled "Route Selection Method/Device and Communication Network Design Method/Device," 1 pg. Publication Date—Mar. 28, 1997.

* cited by examiner

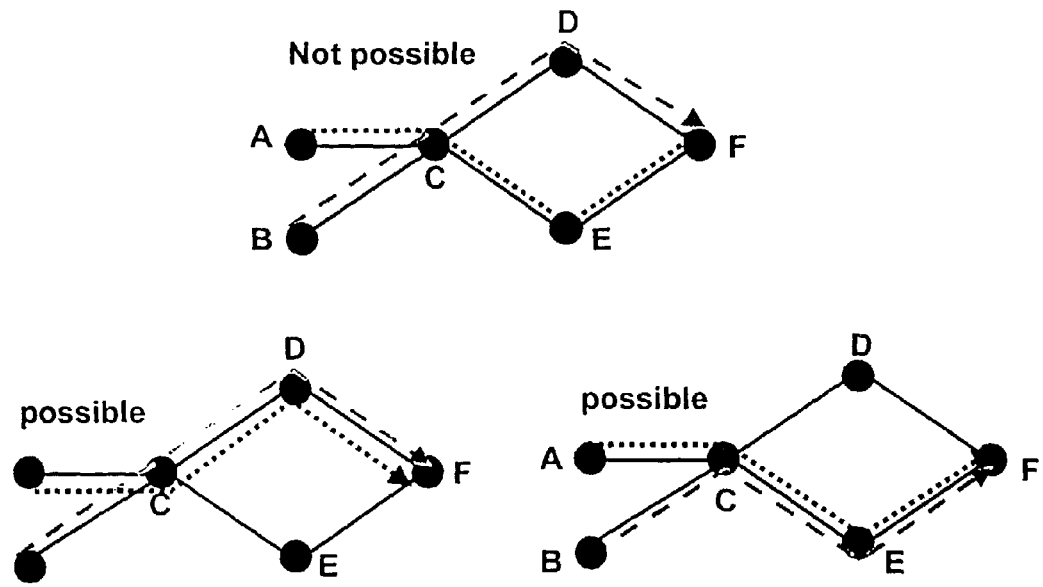
Figure 1: single path routing on data paths in a network
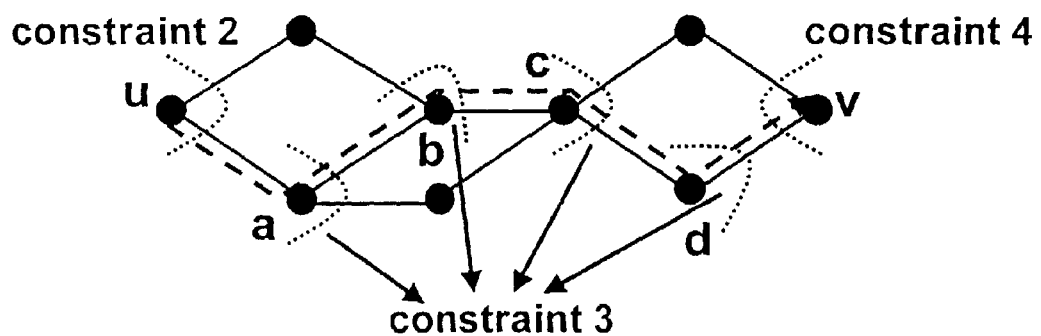
Figure 2: transport constraints on data paths in a network

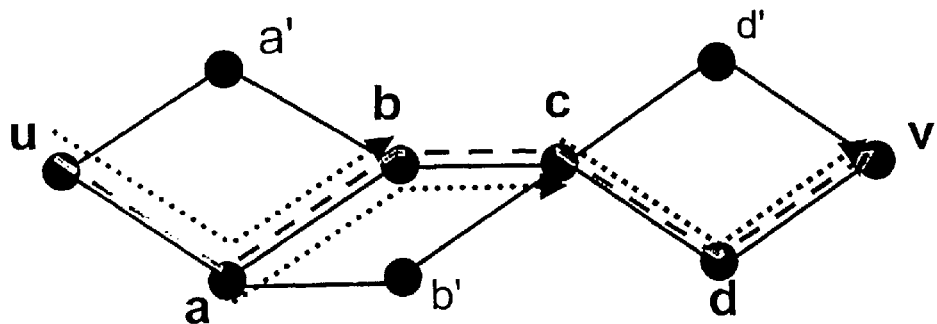
Figure 3: routing constraints according to the invention on data paths in a network
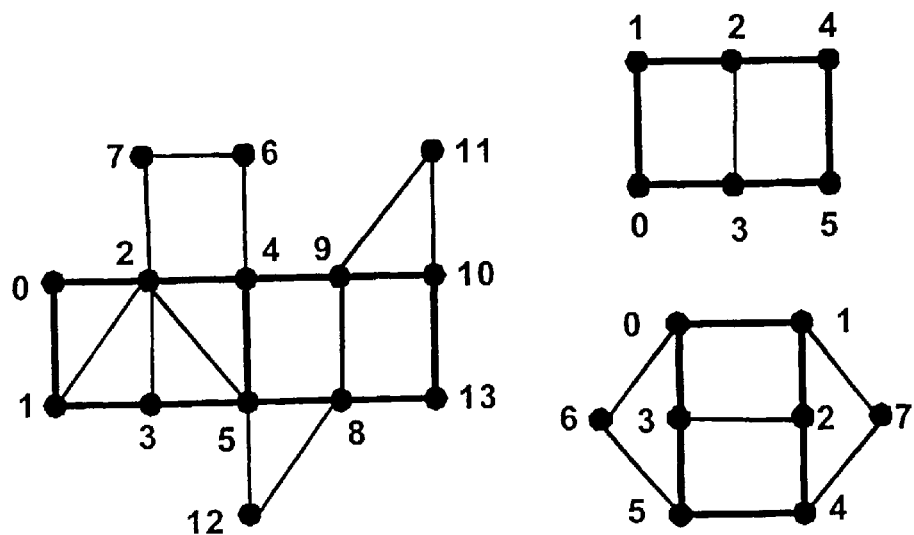
Figure 4: example networks with 6, 8 and 14 nodes/routers

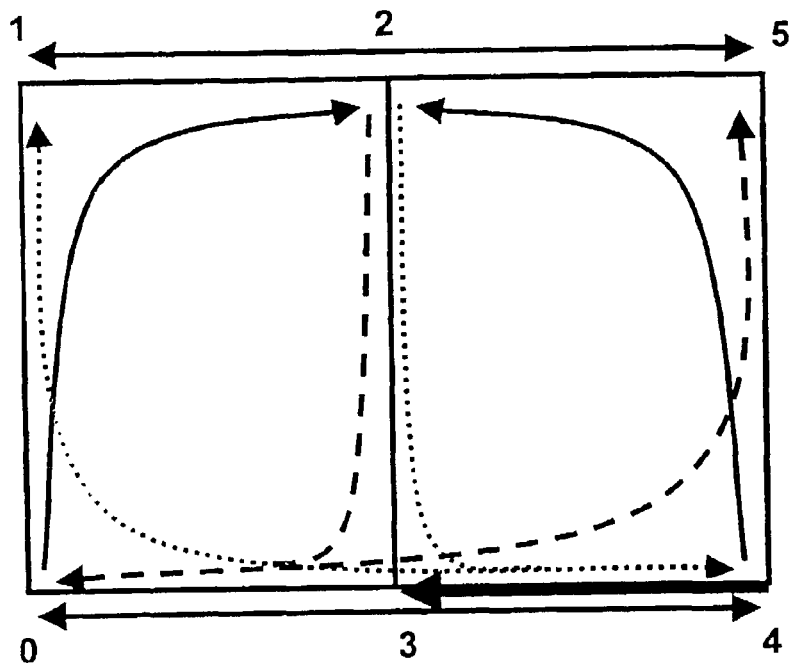
Figure 5: data routing according to the invention for minimized average link utilization
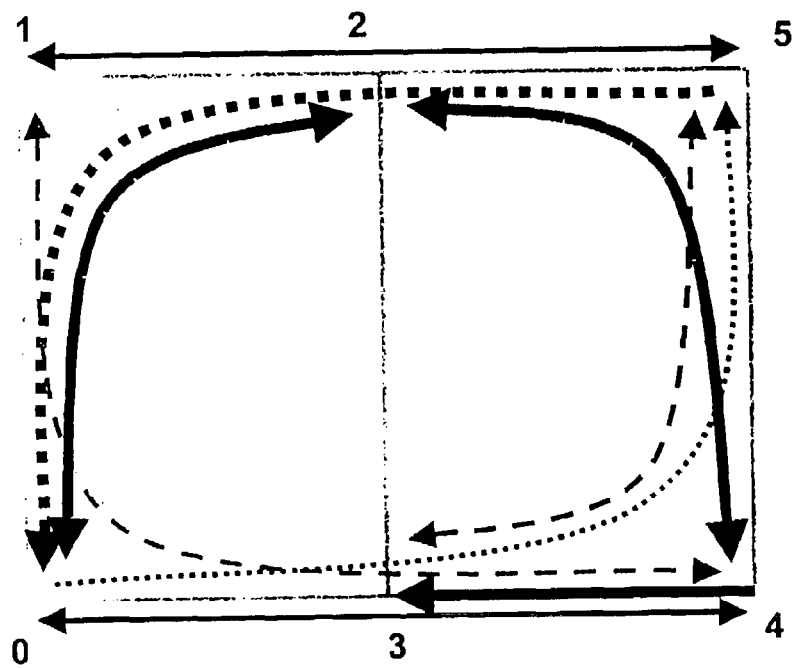
Figure 6: data routing according to the invention with minimized maximum link utilization

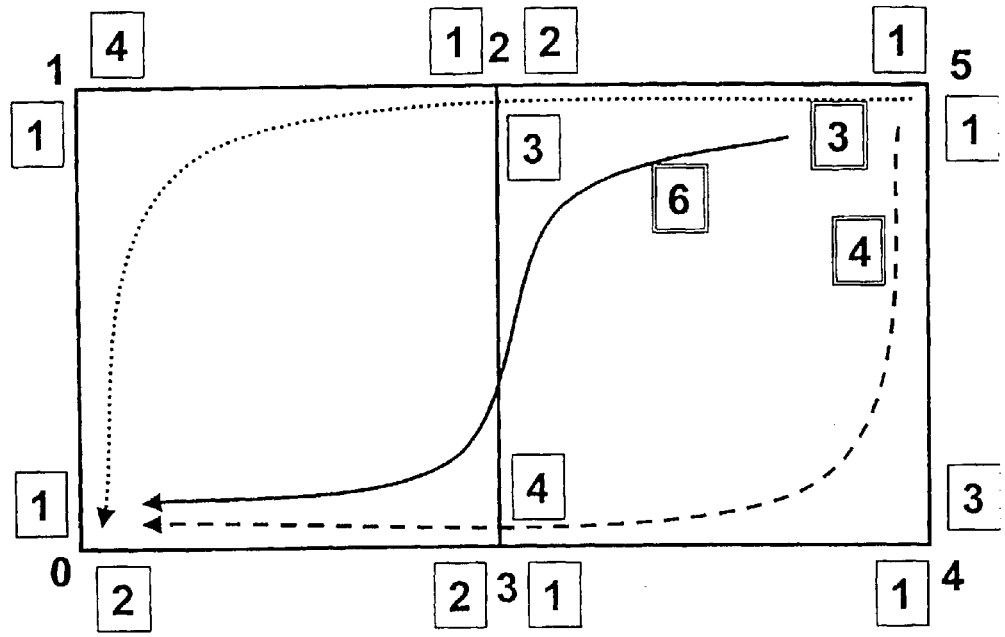
Figure 7: link costs with minimized maximum link utilization
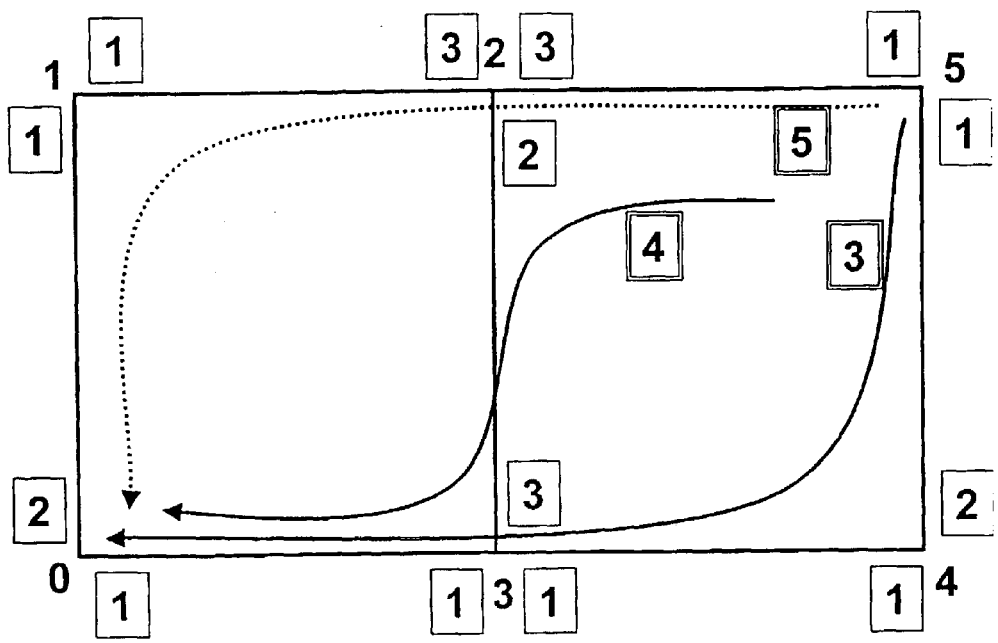
Figure 8: link costs with minimized maximum link utilization

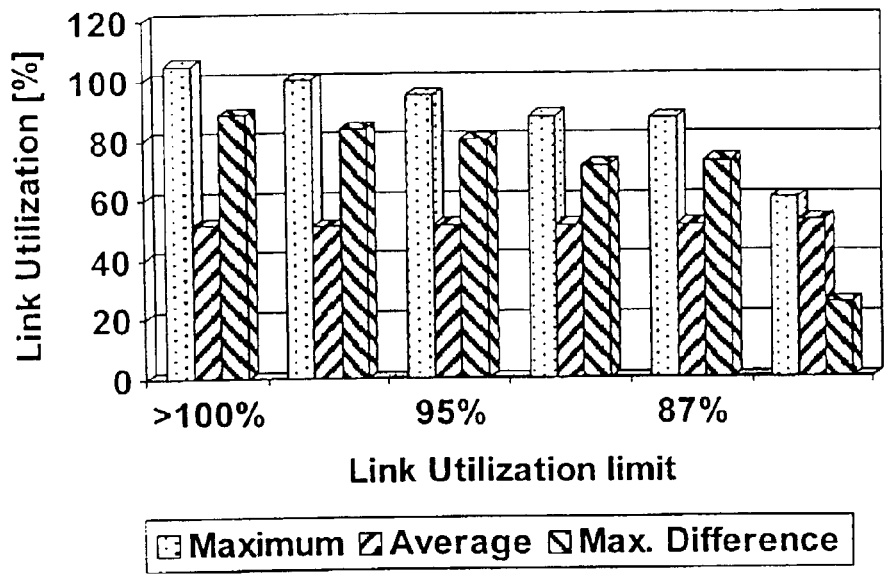
Figure 9: changes of link utilizations according for the invention for the 8 node network
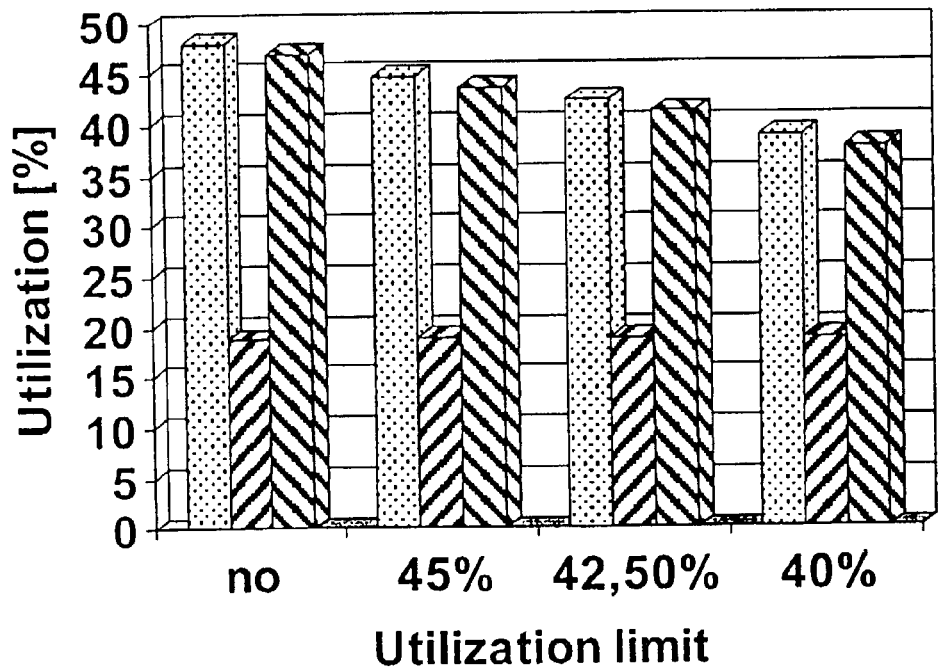
Figure 10: changes of link utilizations for selected data links of the 14 node network

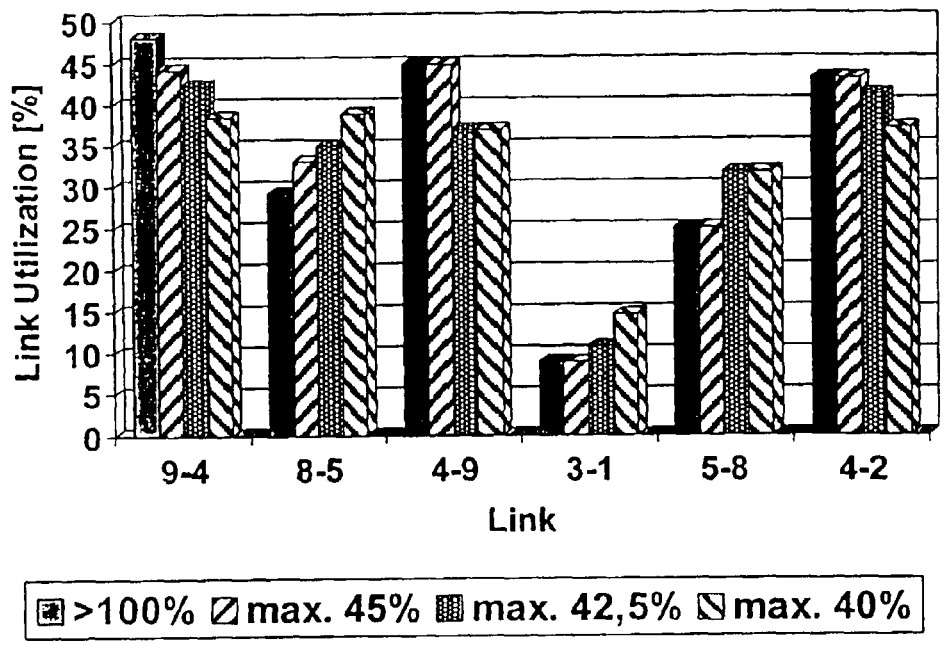
Figure 11: link utilization for selected data links of the 14 node network
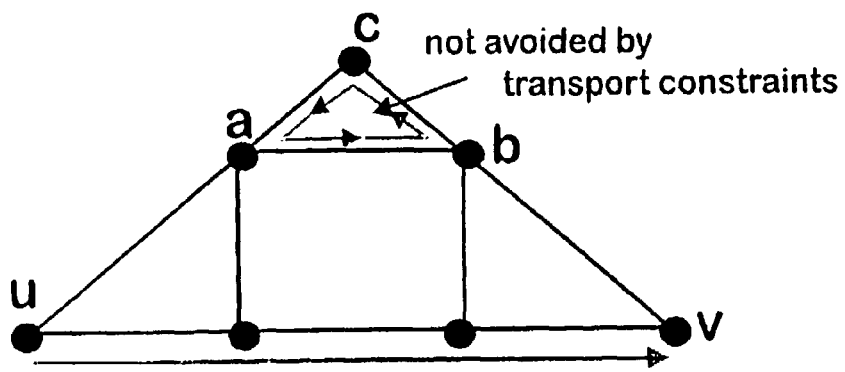
Figure 12: loops which are only avoided by the objective function and not by the transport constraints

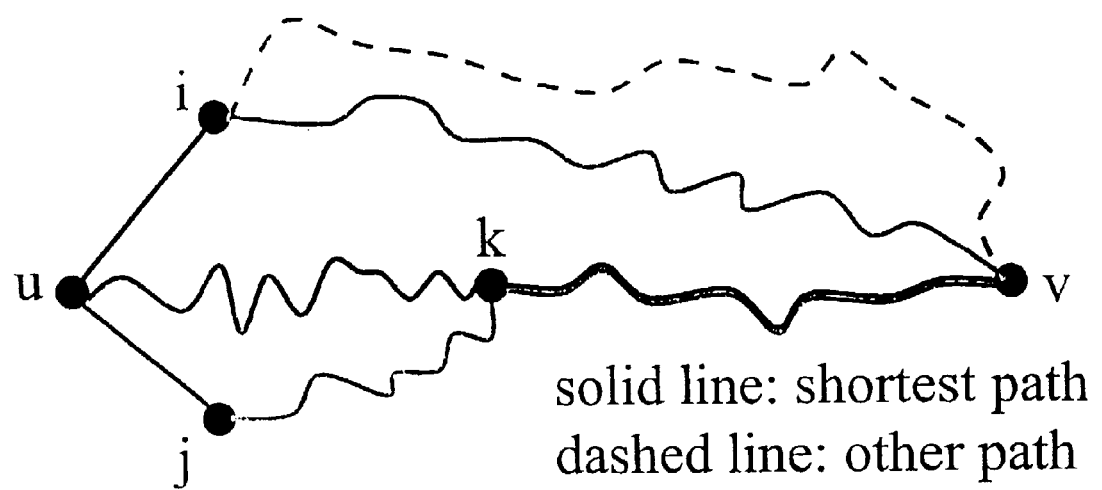
Figure 13: Example for link cost algorithm

METHOD AND SYSTEM FOR CONTROLLING DATA TRAFFIC IN A NETWORK

FIELD OF THE INVENTION

The present invention relates to a method and a system for communication of data in a network. In particular, the present invention relates to a method and a system for controlling the communication of data via an optimum data path from a sending node to a receiving node in a network having a plurality of nodes being connected via data links, wherein the optimum data paths used for data communication in the network are defined as the data paths which lead to the minimum link costs.

BACKGROUND OF THE INVENTION

For data communication in a network, the data to be communicated is routed through the network, i.e. the data or data packets thereof are directed via data links of the network from a data sending node to a data receiving node. In order to route data correctly via data links of a network and over nodes of the network connected by the data links routing strategies or so-called routing protocols representing routing strategies are employed. The most popular routing protocols are the Routing Information Protocol (RIP), the Enhanced Internet Gateway Routing Protocol (EIGRP), the Intermediate System-to-Intermediate System (IS-IS) and the Open Shortest Path First (OSPF) protocol. These protocols are used as so-called interior gateway protocols for routing of data in networks which are under a common network administration. Data networks (e.g. the INTERNET) do not have predefined data paths/connections between a sending node and a receiving node, in contrast to networks having fixed communication connections (e.g. telephone networks). Interior routing protocols are in general based on an approach wherein data communication from a sending node to a receiving node is not performed via predefined data links and nodes of the network. Instead, data or data packages are communicated from one node to another, wherein each routing decision which data link to the next node has to be chosen is "made up" by each node separately. Therefore, a node also referred to as router transmitting data to other nodes/routers does not "know" the complete data path or the data links forming the data path, respectively, for the communication of data from the sending node to the receiving node. Each node/router for itself make its own routing decision depending on its routing information to which next node/router the data or data packages thereof can be transmitted. As a consequence, the routing decision, i.e. the determination of the next node/router to which data is transmitted is made locally by the node/router communicating the respective data.

If the operation condition of each node/router within the network is known, it is possible to determine a data path and the data links forming the data path over which data or data packages thereof are communicated through the network. The operation condition of each node/router and, in particular, the routing decision of each node/router is determined via a cost function which determines the cost of the links. The cost function is protocol specific and can depend on the capacity of the links, the type and/or amount of data to be communicated, the utilization of data links to nodes to which data have to be transmitted, the (physical) delay and the data communication situation of the whole network. In practice the cost functions depend only on static and/or predefine variables like the capacity of the links and a delay value for the links which are once defined in the router database. Therefore if no errors in the network occur, the operating conditions of nodes/routers of a network do not vary during data communication, which makes it possible to determine the data path over which data will be communicated from the sending node to the receiving node.

A further fundamental principle of the interior routing protocols mentioned above is to always choose the shortest data path between a sending node and a receiving node. The routing protocols define a metric according to which the length of a data path is determined and information for the determination of the shortest data path are distributed over the network. For example, the Open Shortest Path First (OSPF) protocol commonly uses an additive metric based on time independent parameters such as the data communication capacity of data links (e.g. CISCO routers) or/and the delay for data communication over data links. In the OSPF-metric, the costs for each data link from a node/router to other nodes/routers connected thereto are inputted. Data communication parameters of a data link between a node/router to the next node/router can depend on the direction of data communication over the data link. Thus, the costs for data links may vary in relation to the data communication direction. The overall costs of a data path is obtained by a summation of all costs of the data links included by the data path.

The metric of the Enhanced Internet Gateway Routing Protocol (EIGRP) is more complicated than the metric of the OSPF-protocol but is mostly used in a form reduced to an additive metric.

The approach always to select the shortest data path implies a single-path routing, i.e. the routing between two nodes/routers is identical for all data flows. It is possible to define a multipath routing but for stability (e.g. loop protection) and protocol depended reasons (e.g. TCP performance degeneration in the case of reordered packets) it is rarely used. As a result of the fixed cost metric and the single path routing, congestions of data paths or single data links included of a data path may occur. This occurs for example if the amount of data is larger than the data communication capacity of single data links. Similar problems can occur if the data communication capacity of a node/router is not sufficient to communicate the desired amount of data, e.g. if the node/router is included by data paths of different sending nodes and/or different receiving nodes.

Furthermore, specific data paths and/or data links may be utilized very often, while other may be used only sometimes. This unequal distribution of data communication over the data links results in an unequal link utilization of the network data links. This unequal link utilization may also lead to congestions for different data links. Even in the case of high utilized links the network is not applicable for real time applications like IP telephony because of the nonlinear dependency between the load and the waiting time. Furthermore, such a routing of data in a network leads to an uneconomic operation of the network since data links, which are provided within the network requiring expensive hardware and software means, are not used.

The conventional approach to optimize routing of data in a network was to improve/enhance existing routing protocols or to develop new routing protocols. Since altered or new routing protocols must be established throughout the whole network, usually, altered or new hardware and software components are required. Therefore, this optimization is mainly limited due to organizational problems.

OBJECT OF THE INVENTION

The object of the present invention is to solve the above described problems of the state of the art. In particular, the present invention is directed towards an optimization of routing of data in a network using existing routing protocols, namely without modifying or replacing routing protocols already used in a network and the respective hardware and software components of the network. Moreover, the present invention provides a method and a system for routing data in a network to achieve a homogeneous distribution of communicated/routed data or data traffic, respectively, throughout the network. The method is also applicable for traffic engineering in MPLS and routing in further (e.g. with optical/digital wrappers) optical networks.

SHORT DESCRIPTION OF THE INVENTION

To solve the above problem, the present invention provides a method for controlling data traffic in a network as illustrated in FIG. 14.

The method according to the invention is based on the approach to optimize the routing of data in a network on the basis of a linear optimization problem. The linear optimization problem according to the invention has to be defined such that data routed/communicated in a network also referred to as data traffic is uniformly/homogeneously distributed over the network. In terms of the invention, the expression "uniform/homogeneous distribution" of data traffic should not be understood as "equal distribution" of data traffic. An equal distribution of data traffic throughout the network would result in identical/equal data traffic for each data link connecting nodes of the network.

Although an "equal distribution" of data traffic can represent an optimum solution of the linear optimization problem according to the invention, the method according to the invention is not specifically applied to obtain an "equal distribution" of data traffic but is directed to an optimization of routing of data in a network wherein link utilizations of data links in the network may be different.

The method according to the invention is used to communicate data via an optimum data path from a sending node to a receiving node in a network having a plurality of nodes connected by data links. In the following, the term "data path" is used for data paths between the sending node and the receiving node, wherein data paths are formed by respective ones of the data links.

For the determination of an optimum data path from a sending node to a receiving node, all loop-free data paths from the sending node to the receiving node over respective data links and nodes are determined and data paths are selected such that all data communicated between two nodes are communicated via the same data path. Following, link costs for the selected data paths are determined and the data path having the minimal link costs is defined as the optimum data path. Then, the data are communicated from the sending node to the receiving node via the optimum data path.

Further, the selection of data paths can comprise determination of data communication capacities of the data paths and selecting data paths having data communication capacities sufficient to communicate the data from the sending node to the receiving node, and/or determination of physical delays of the data paths and selecting data paths having physical delays equal or smaller than a predetermined maximum physical delay.

The determination of the optimum data path from the sending node to the receiving node can be based on the definition of an equation system for a linear optimization problem and the solution of the equation system to define the optimum data path.

For the equation system, an objective function can be defined which includes a term being indicative of the link costs.

Also, it is possible to define an objective function including a term representing maximum link utilizations, or average link utilizations, or values indicative of combinations of the maximum link utilizations and/or the average link utilizations and/or the link costs.

Beside the objective function, a linear optimization problem requires the definition of constraints. According to the invention, cost constraints for the link costs of the selected data paths can be defined.

Moreover, transport constraints can be defined for flow conservation and/or together with the average link utilization part of the objective function for determination of loop-free data paths.

Further, routing constraints can be defined such that all data, which are to be communicated from the sending node to the receiving node, are communicated via the same data path. Such a definition of routing constraints allows to utilize existing routing protocols which select the shortest data path between nodes/routers and employ a single-path routing.

Additionally, capacity constraints can be defined for the determination of data paths having sufficient data communication capacities, preferable maximum data communication capacities being equal or larger than the amount of data to be communicated and/or data communication capacities being equal or smaller than a predefined maximum link utilization.

A further definition of physical delay constraints allows the determination of data paths having physical delays being equal or smaller as a predefined maximum physical delay. In terms of the invention, the physical delay represents the time required to communicate data between nodes of the network connected by respective data links.

In order to obtain an optimum data path, the equation system for the linear optimization problem is solved by a minimization of the object function regarding the constraints. Solving the equation system, all possible data paths from the sending node to the receiving node are determined and the data path having the minimal link costs is defined as optimum data path. Especially for complex networks including many nodes and connecting data links, it can be advantageous to perform the minimization of the objective function iteratively.

With respect to the value indicative of combinations of the average link utilization and/or the maximum link utilization and/or the link costs, a function can be used which represents the average link utilization and/or the maximum link utilization and/or the link costs weighted in relation to each other.

More particularly, the component of the objective function having a higher influence/importance for the determination of the optimum data path is weighted by a higher value compared to the weighing value for the other component of the objective function.

In order to minimize the number of selected data paths which are to be considered in the determination of the optimum data path, it is possible to exclude data paths having link costs exceeding a predefined link cost range. For example, the link cost range can be defined between 1 and a predefined upper threshold, e.g. a value four times larger compared to the number of routers of a network including the sending and receiving nodes.

With respect to the complexity for solving of the equation system, which can be very time consuming, it is possible to use the last solution of the equation system which has been determined within a predefined time interval. For example, this approach is preferred if, within the predefined time interval, the objective function is not feasible, no minimum can be determined for the objective function, or the objective function does not converge.

Depending on the network for which the method according to the invention is used, the number of variables for the definition of the equation system can be extremely high. In particular, the number of variables for the objective function is in the magnitude of $N^2M^2$, wherein N represents the number of nodes/routers and M represents the number of data links. Determined by the routing constraints, the number of variables for the constraints according to the invention is in the magnitude of $N^3M^2$. In order to reduce the number of variables and/or to reduce the number of data links to be considered for the solution of the equation system, preferable in the case of large networks, the method comprises a determination of the time for data communication from the sending node to the receiving node for all loop-free data paths. Further, data paths are identified as data paths to be considered for the solution of the equation system for which the smallest data communication time and/or a data communication time being smaller than a predefined maximum data communication time have been determined. Preferable, the maximum data communication time is predefined in relation to the smallest determined data communication time.

With respect to the identification of data paths being considered for the solution of the equation system, only data links included in possible data paths are used. Moreover, it is possible not to consider data links for the solution of the equation system which are not included in all possible data paths.

For some networks, predefined communication time limits representing the maximum time for data communication between nodes are employed. In order to consider such predefined communication time limits, it is possible to define the physical delay constraints on the basis of predefined communication time limits. Here, the physical delay constraints are not determined by the actual time required for the communication of data between nodes but by the predefined communication time limits for respective data links.

Likewise, characteristics of a network resulting from the band widths of the data links are considered by defining the physical delay constraints on the basis of the bandwidths of the data links. Instead of using the actual time for the communication of data over a specific data link, the bandwidths of the data links are transformed into respective physical delays.

As an alternative to the above equation system, it is possible to determine the link costs on the basis of a linear optimization problem. Here, it is preferred to obtain the link costs by computing an inequality system for the linear optimization problem. Accordingly, it is possible that a data path of the selected data paths having a sum of link costs being larger compared to sums of link costs for remaining data paths can be selected as the optimum data path.

It is preferred to define cost constraints for all of the selected data paths other than the optimum data path such that the link costs of the optimum data path are forced to be smaller than the link costs for all of the selected data paths other than the optimum data path.

In order to reduce the complexity of the inequality system, it is possible to define cost constraints for those of the selected data paths other than the optimum data path which start from a node neighboring the sending node of the optimum data path and end at the receiving node of the optimum data path, and which do not include further nodes of the optimum data path, while no cost constraints are defined for the remaining of the selected data paths other than the optimum data path.

Due to the fact that the amount of data to be communicated between a sending node and a receiving node may vary over the time and due to the fact that several sending and/or receiving nodes are communicating over the network, it is preferred to perform the determination of the optimum data path according to the invention continuously, at predefined times, or in predefined time intervals. Here, it is possible to determine the amount of the data to be communicated continuously, at predefined times, or in predefined time intervals, wherein different predefined times and/or different predefined time intervals can be used for the determination of the optimum data path and the determination of the amount of data to be communicated.

As an alternative, it is possible to determine the optimum data path for a predefined (e.g. maximal) amount of data to be communicated. Preferable, the predefined amount of data to be communicated is sensed or approximated.

Especially in the case of very large/complex networks, there is often a possibility to divide the network into at least two parts or partial networks for each of which the determinations of the optimum data paths are performed separately. Due to the shortest path principle the concatenated solution of the smaller networks is equal to the solution obtained by the optimization of one large network.

Moreover, it is possible to group at least a part of a network to a virtual node. Here, the determination of the optimum data path in the remaining portion of the network including the virtual node and the determination of the optimum data path in the grouped part of the network representing the virtual node are performed separately.

The present invention also provides a system for communication of data in a network via an optimum data path. The system comprises a network having nodes/routers connected by data links, wherein at least one of the nodes is a sending node and at least one of the nodes is a receiving node, and control means being connected to the network for controlling data communication in the network. In particular, the control means are adapted to carry out one of the methods according to the invention for communicating data via an optimum data path.

The control means can be a central control system or a component of a central control system (e.g. an INTERNET-server) controlling data communication of at least one node/router, preferable of all nodes/routers.

Further, the control means can comprise at least one control unit associated with one or several nodes/routers for controlling data communication thereof. In order to control data communication in an optimal manner and/or to control data communication of further nodes/routers, such a control unit should be in communication with the further nodes/routers, preferable with all nodes/routers to obtain information of data communication within the network.

Especially for large networks and/or network exhibiting a high amount of data communication, a combination of a central control system and at least one control unit can improve the identification of optimum data paths, because data communication control functions for single nodes and data communication control functions related to the entire network can be accordingly distributed to different components of the control means.

SHORT DESCRIPTION OF THE FIGURES

FIG. 1 illustrates the effects of a single-path routing on data paths in a network.

FIG. 2 illustrates the effects of the transport constraints on data paths in a network.

FIG. 3 illustrates the effects of the routing constraints according to the invention on data paths in a network.

FIG. 4 shows example networks with 6, 8 and 14 nodes/routers.

FIG. 5 illustrates the data routing according to the invention for the 6 node network for minimized average link utilization.

FIG. 6 illustrates the data routing according to the invention for the 6 node network for minimized maximum link utilization.

FIG. 7 illustrates the link costs for the 6 node network with minimized average link utilization according to the invention.

FIG. 8 illustrates the link costs for a 6 node network with minimized maximum link utilization according to the invention.

FIG. 9 shows a diagram for the changes of link utilizations according to the invention for the 8 node network.

FIG. 10 shows a diagram for the changes of link utilizations according to the invention for the 14 node network.

FIG. 11 shows a diagram for the link utilizations according to the invention for selected data links of the 14 node network.

FIG. 12 shows loops which are only avoided by the objective function and not by the transport constraints.

FIG. 13 shows an example for link cost algorithm according to the invention.

DESCRIPTION OF PREFERRED EMBODIMENTS OF THE INVENTION

Figure 14:
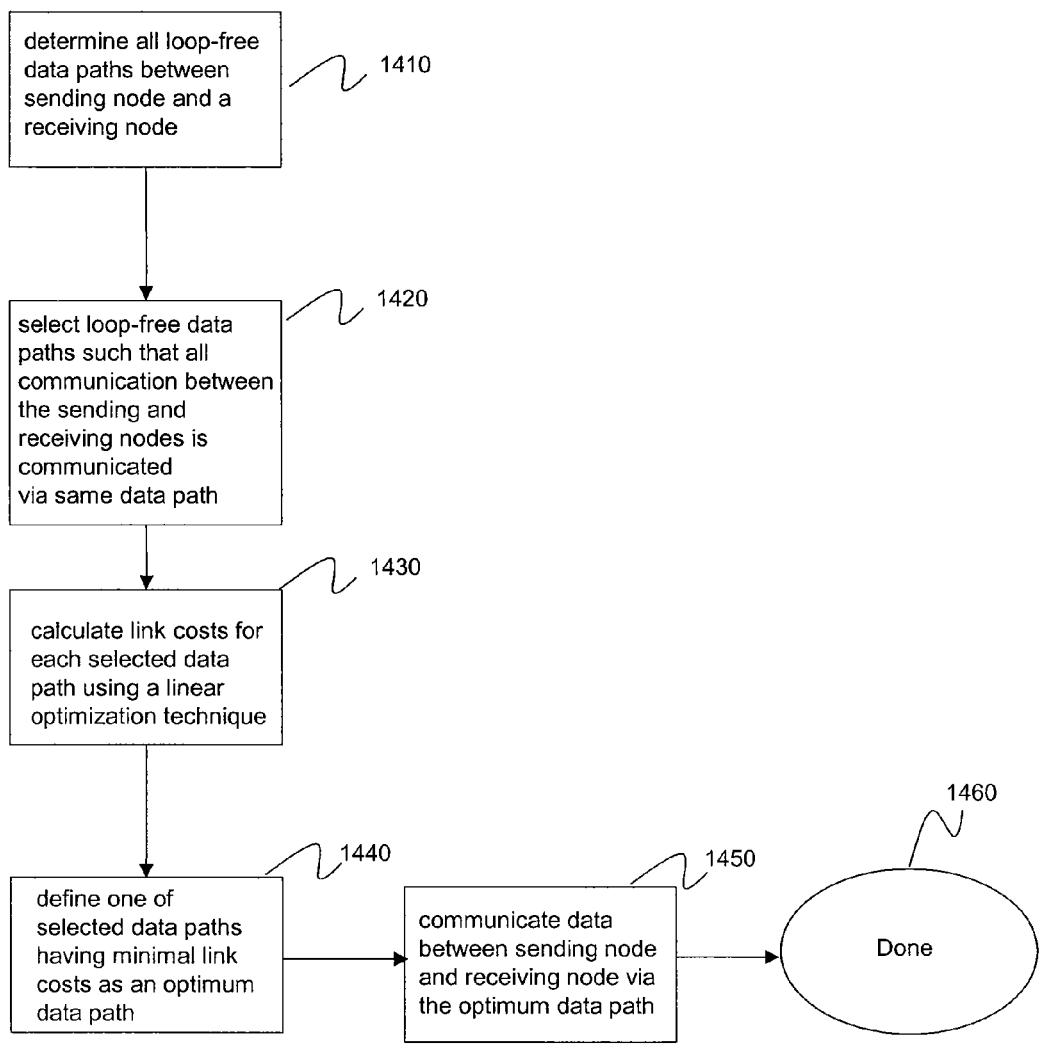
FIG. 14 is a flowchart illustrating steps by which data traffic is controlled in a network having a plurality of nodes connected via data links, in accordance with an embodiment of the present invention.

In general, nodes of a network are computer based systems/units (server) which can receive and transmit data via data links which are connected with respective nodes. The nodes can be operated as sending nodes from which data send into a network are originating. Further, the nodes can be operated as receiving nodes serving as a destination for receiving data communicated from a respective sending node. Moreover, the nodes can be operated as so-called routers which receive data from the sending node or from another node/router and transmit the received data to a further node/router or the receiving node.

Data links between nodes of the network are often referred to as interfaces since the data links do not only comprise lines for the physical transmission of electrical/optical signals representing data to be transmitted but also hardware and software components required for the transmission of data in a data network. Such hardware and software components include conventional electrical lines, data busses, buffer/memory units, processor based units, software programs for data conversions and implementation of data communication protocols (i.e. routing protocols), and the like.

In order to achieve the objective of the present invention, namely to minimize all link utilizations (average link utilizations), to minimize the maximum link utilization, and to keep the physical delays of the data links between nodes of a network in a certain range, it is necessary to describe formerly the network and the data traffic thereof, i.e. the amount and flow of data communicated in the network. For this formal description, three matrixes are used:

First, a network with N nodes is defined by a capacity matrix C having the size N×N, wherein each entry of the capacity matrix C represents the link capacity $c_{ij}$ for each pair of nodes i and j. In case no data link is existing between two nodes, the respective entry in the capacity matrix C is set to 0.

The second matrix is a traffic matrix F which comprises an entry $f_{ij}$ for each pair of nodes i and j. Each entry $f_{ij}$ represents the data traffic/data flow between two nodes i and j. If no data is exchanged between two nodes, the respective entry in the traffic matrix F is set to 0. Depending on the implementation of the method according to the invention, the entries $f_{ij}$ of the traffic matrix F can represent static data flows or, e.g. if the method according to the invention is carried out continuously during the operation of a network, the entries $f_{ij}$ can represent the actual data flows between nodes of the network.

Third, a matrix D is introduced which describes the physical delays of the data links. The physical delay of a data link identifies the time necessary to communicate data between two nodes over the respective data link. The entries $d_{ij}$ of the matrix D represent the physical or approximated delay of a data link connecting two nodes i and j.

Based on these matrixes, the routing optimization according to the invention can be defined as a linear optimization problem. As known, a linear optimization problem is described by an equation system consisting of two parts, the objective function and the constraints. The constraints define a multi-dimensional solution space wherein an optimal solution of the objective function has to be determined. The optimal solution of the objective function is the solution within the solution space producing, in case of the invention, the minimal value for the objective function. To achieve an optimization of data routing in a network, different constraints limiting possible solutions of the objective function have to be fulfilled.

First, for data communicated from a sending node to a receiving node, data paths have to be determined over which data can be transmitted/routed. In case the sending node and the receiving node are not directly connected by a data link, possible data paths include not only the sending and receiving nodes but also further nodes and respective data links connecting the same. In order to avoid that different data transmitted from a sending node to a receiving node are routed/transmitted over different data paths or data links, respectively, possible routings/data paths were restricted to a so-called single path routing. The single-path routing constraints ensures that exactly one data path between two nodes/routers is defined for a possible solution of the objective function. The effect of such a single-path routing is illustrated in FIG. 1. The shortest data path, independent of the used routing protocol metric, between nodes/routers C and F is either over node/router D or over node/router E. As a result of the single-path routing, both data flows A-F and B-F are routed first over node/router C and then either over node/router D or over node/router E, but not one flow over node/router D, while the other is routed over node/router E.

Second, capacity constraints have to be fulfilled according to which the amount of data communicated over a specific data link does not exceed the capacity of the respective data link, i.e. the maximal amount of data which can be communicated over the respective data link. The capacity of a data link in a network is not limited to the physical transmission capacity of the different transmission components of the data link (i.e. electrical wires, busses, processors), since data to be transmitted or data packages thereof can be stored for example in intermediate memories of data links and/or of nodes/routers before transmission. Two approaches can be used to define capacity constraints in terms of a linear optimization problem. One of the approaches is path-oriented, while the other is flow-oriented with respect to data links. Here, the flow-oriented approach was chosen to present in detail because of it's easier understanding. After the description of the flow oriented approach the changes in the notation of the method for the path oriented approach are described.

In order to apply the method for an routing optimization according to the invention in combination with existing routing protocols, the routing algorithms specified by the used routing protocols has to be considered. As mentioned above, routing protocols currently in use, i.e. the OSPF-protocol and the EIGRP, are based on routing algorithms for the determination of the shortest data path for data to be routed from a sending node to a receiving node. These algorithms for the shortest data path routing imply that all data communicated between two nodes/routers are routed over the same data links.

Objective Function

The objective is to achieve a distribution of transmitted data or a data traffic distribution as homogeneous/uniform as possible throughout the entire network. In other words, all data links of the network should be utilized as equal as possible at a data communication level as low as possible. Since the flow-oriented approach is utilized, for each data flow between nodes/routers i and j having a data traffic entry $f_{ij} \geq 0$ in the data traffic matrix F and for each data link having a capacity entry $c_{ij} > 0$ in the capacity matrix C, a Boolean variable $x_{ij}^{uv}$ is introduced. This variable is set to 1 if a data flow uv from a sending node u to a receiving node v is routed over the data link ij between nodes i and j, otherwise this variable is set to 0. Further, a variable t is introduced defining an upper threshold for the link utilization of all data links.

Both the maximum link utilization and the average link utilization have to be minimized. Therefore, the objective function includes two additive parts both of which have to be minimized:

$$a_i * t + \sum_{ij} \sum_{uv} \frac{f_{uv} x_{ij}^{uv}}{c_{ij}}, \text{ with } c_{ij} > 0 \tag{1}$$

The left additive part of the objective function (1) represents the maximum link utilization, while the right additive part of the objective function (1) represents the average link utilization. The parameter at of the maximum link utilization part of the objective function (1) is used as a weighting factor for weighting the maximum link utilization part with respect to the average link utilization part of the objective function (1). The parameter at is chosen in regard to the influence/importance of a small/minimized maximum link utilization for the selection of an optimum data versus the influence/importance of a small/minimized average link utilization. For example, if the minimization of the maximum link utilization has a higher priority compared to the minimization of the average link utilization, the parameter at should be chosen to have a large value resulting in a reduction of the maximum link utilization by directing data traffic to less utilized data links. Comparable, the parameter at should be chosen to have a small value if the influence of the minimization of the average link utilization onto the selection of an optimum data path should be higher than the influence of the minimization of the maximum link utilization.

Transport Constraints

The transport constraints ensure that for each data flow, for example a data flow from a sending node u to a receiving node v, exactly one loop-free data path from the sending node u to the receiving node v is specified by the values of the variables $x_{ij}^{uv}$ resulting from the solution of the objective function (1). Here, the transport constraints comprise four sub-constraints for each data flow:

1. The data flow uv from the sending node u to the receiving node v being transmitted over node/router i is routed over only one data link leading out of node/router i:

$$\sum_{j=1, c_{ij}>0}^{N} x_{ij}^{uv} \leq 1, \text{ for all flows } uv \text{ and all nodes/routers } i \tag{2}$$

2. The data flow uv from the sending node u to the receiving node v is routed via exactly one link ui from the sending node u to another node/router i:

$$\sum_{j=1, c_{ui}>0}^{N} x_{ui}^{uv} - \sum_{i=1, c_{iu}>0}^{N} x_{iu}^{uv} \geq 1, \text{ for all flows } uv \tag{3}$$

3. For all data flows uv from the sending node u to the receiving node v and for each router i except the sending and receiving nodes u and v, the number of data links leading into router i and the number of data links leading out of the router i used by data flows uv are equal:

$$\sum_{j=1, c_{ij}>0}^{N} x_{ij}^{uv} - \sum_{j=1, c_{ji}>0}^{N} x_{ji}^{uv} = 0, \tag{4}$$

for all flows $uv$ and all nodes/routers $i \notin \{u, v\}$

4. The data flow uv from the sending node u to the receiving node is routed over exactly one data link leading into the receiving node v:

$$\sum_{i=1, c_{iv}>0}^{N} x_{iv}^{uv} - \sum_{i=1, c_{vi}>0}^{N} x_{vi}^{uv} \geq 1, \text{ for all flows } uv \tag{5}$$

The effect of the transport constraints defines exactly one loop-free data path from the sending node u to the receiving node v is illustrated in FIG. 2. According to equation (3), only data link ua connecting the node u and the node a carries the data flow uv. One data link is leading into each of the nodes/routers a, b and c. In line with equation (4), one data link is leading out of each of the nodes/routers a, b and c for the data flow uv. Conditioned by equation (5), the data path for the data flow uv is directed over the data link cv between node/router c and the receiving node v and terminates in the receiving node v.

Nevertheless, it is still possible that a looped data path exists beside the chosen data path for the data flow uv since such loops are not avoided by the transport constraints (see FIG. 12). However, such loops are avoided by the minimization of the average link utilization in the objective function (1).

Capacity Constraints

The capacity constraints ensure that the amount of data or the data traffic over data links do not exceed the capacity of the respective data links. The capacity constraints comprise two sub-constraints for each data link ij between nodes i and j.

The first sub-constraints force the link utilization to be below a fixed level defined by a parameter $a_c$:

$$\sum_{uv} x_{ij}^{uv} f_{uv} \leq a_c c_{ij}, \text{ for all data links } ij \text{ with } c_{ij} > 0 \qquad (6)$$

As set out above, data links within a data network are able to handle for a short time interval data traffic being larger than the physical transmission capacity of the respective data link. Therefore, the parameter $a_c$ is not restricted to values between 0 and 1. To set the parameter larger than 1 is also useful to identify links which are the first bottlenecks in case of congestion. For the method according to the invention, the parameter $a_c$ is set to 1 as a default value.

The second sub-constraints given by equation (7) defines an upper threshold for the link utilizations. The variable t used in the objective function (1) defines an upper bound for the utilization of all links. While the parameter $a_c$ is a fixed value, the variable t is to be minimized. The second sub-constraints force all link utilizations to have a value being lower than the value of the parameter t:

$$\sum_{uv} x_{ij}^{uv} f_{uv} \leq \frac{t}{100} c_{ij}, \text{ for all data links } ij \text{ with } c_{ij} > 0 \qquad (7)$$

Routing Constraints

The routing constraints are the most important constraints since the routing constraints define only such combinations of data links or data paths, respectively, sufficiently to calculate the costs for data communication/routings obtained by a solution of the equation system for the linear optimization problem. Using the above-mentioned routing protocols, data are always communicated/routed over the shortest data path which is defined by a certain routing protocol metric for each data link. As a consequence, all data flows from node/router i to node/router j have to be communicated/routed over the same data link(s) between nodes/routers i and j.

These constraints are achieved by a recursive system of sub-constraints:

$$x_{ui}^{uv} + x_{st}^{iv} - x_{st}^{uv} \leq 1, \text{ for all data flows } uv, \text{ nodes/routers } i \notin \{u, v\}, \text{ and data links } st \qquad (8)$$

$$x_{jv}^{uv} + x_{st}^{uj} - x_{st}^{uv} \leq 1, \text{ for all data flows } uv, \text{ nodes/routers } j \notin \{u, v\}, \text{ and data links } st \qquad (9)$$

Conceiving an iterated or recursive application of equations (8) and (9), the routing between nodes/routers i and j is identical for all data flows through these nodes/routers. Therefore, the found solutions based on the routing constraints are corresponding with the implementation of the routing protocols.

FIG. 3 illustrates the effect of the routing constraints. Assuming that data flow ub is routed over nodes u, a and b, data flow ac is routed over nodes a, b and c and data flow cv is routed over nodes c, d and v, due to equations (8) and (9), data flow uv from the sending node u to the receiving node v has to be routed over nodes u, a, b, c, d and V.

For data flow uc, two further data paths exist either over node a' or node b'. The data path including node a' not be used for the data flow uc, since this data path does not include node a which would be contradictory to equation (9). Moreover, the data path including node b' can not be used for the data flow uc, since this data path does not include node b which would be contradictory to equation (8). In other words, the data path including node a' and the data path including node b' can not be used for the data flow uc, because these data paths do not fulfill the routing constraints to route all data flows, i.e. the data flows uc, ac and bv, over the same data links.

Physical Delay Constraints

On the basis of the objective function (1) in combination with the transport constraints, the capacity constraints and the routing constraints, a data routing can be achieved having the shortest path routing with an homogeneously, uniformly distributed data traffic. In order to obtain the goal to keep the physical delays for data communication in a network in a certain range, the physical delay constraints being described below have to be applied.

The range of possible physical delays is defined over a parameter $a_r$, while the lowest physical delay for a data flow is represented by a variable $d_{uv}^{min}$. If P is a set of all loop-free data paths from node u to node v and if $d_p$ is the sum of all physical delays of the data links of a path p, the minimum physical delay $d_{uv}^{min}$ is the delay of the path p from node u to node v with the smallest physical delay $d_p$:

$$d_{uv}^{min} = \min_{p \in P_{uv}} (d_p) \qquad (10)$$

The value of the minimum physical delay is obtained by computing all physical delays of all possible loop-free data paths from node u to node v. Introducing a parameter ar, an upper threshold $a_r d_{uv}^{min}$ can be defined representing the maximum physical delay for each data flow:

$$\sum_{ij, c_{ij} > 0} x_{ij}^{uv} d_{ij} \leq a_r d_{uv}^{min}, \text{ for all data flows } uv \qquad (11)$$

Reduction of the Complexity of the Equation System for the Linear Optimization Problem For the solution of the objective function (1), the number of variables to be considered is in the magnitude of $N^2 M^2$, wherein N represents the number of nodes/routers and M represents the number of data links. Determined by the routing constraints, the number of constraints is in the magnitude of $N^3 M^2$. Especially for large networks including many nodes/routers and data links, the solution of the equation system for the linear optimization problem according to the invention can be very time consuming, complex, or even impossible. Therefore, a so-called pre-solver is used which reduces the number of variables and constraints by considering only relevant data paths for the solution of the equation system.

Relevant data paths are identified on the basis of the respective physical delay. For each data flow between two nodes/routers, all data paths being loop-free paths are determined. For each of these loop-free data paths, the physical delay is calculated, i.e. the sum of the physical delay of the data links forming the respective data path. Data paths having the smallest physical delay and having a delay lower than the upper physical delay threshold $a_r d_{uv}^{min}$ are identified as relevant data paths. Further, all data links of the relevant data paths are checked to be included in all relevant data paths or in none of the relevant data paths. Data links included in all relevant data paths will be used for routing the respective data flow over such data links. Data links included in none of the relevant data paths are not considered by the solution of the equation system of the linear optimization problem such that the respective data flow is not routed via such data links. Data links included only by some of the relevant data paths are considered for the solution of the equation system and the utilization of such data links is determined by the solution of the equation system.

Sub-Optimal Routing

In some cases, for example for very complex networks, it might be advantageous not to calculate an routing using the entire equation system but to utilize an approach described below resulting in a sub-optimal (sub-optimal: get a solution which is near the optimum in a practicable time) routing. In contrast to the above described procedure, the maximum link utilization is not directly minimized. Here, the minimization of the maximum link utilization is achieved by an iterative solution of a linear optimization problem having a different, reduced objective function and different, reduced capacity constraints.

The component $a_t*t$ of the objective function (1) for the minimization of the maximum link utilization is omitted. As a consequence, the sub-constraints for the capacity constraints represented by equation (7) forcing the utilization of different data links below the upper threshold for link utilizations is not necessary anymore. On the other hand, the other sub-constraints for the capacity constraints represented by equation (6) is defined more strictly. Instead of using the default value of 1 for the parameter $a_c$, the parameter $a_c$ is iteratively minimized.

Starting from a value of 1 for the parameter $a_c$, the equation system including the reduced objective function is solved. The link utilizations of single data links are determined on the basis on the found solution of the reduced equation system. In the next step the parameter $a_c$ is set to a value slightly smaller than the smallest determined link utilization. This procedure is repeated until the solution of the reduced equation system is converging. In case the equation system is not converging within a predetermined time interval or no solution of the equation system is existing, the routing determined by the last solution of the equation system is considered as sub-optimal solution of the linear optimization problem.

Path-Oriented Approach

As mention before it is possible to formulate the problem as a path-oriented approach. The method is equal to the flow oriented approach with the following changes:

Variable:

The Boolean variable $p_k^{uv}$ is introduced. This variable is set to 1 if the data flow uv from the sending node u to a receiving node v is routed over the data path k, otherwise the variable is set to 0. k is a index which is equal to u, b, . . . , v where u, b, . . . , v are notes which are building the path.

Objective Function:

Similar to the flow oriented approach the objective function of the path oriented approach includes two additive parts both of which have to be minimized:

$$a_i * t + \frac{1}{|L|} \sum_{ij} \frac{1}{c_{ij}} \sum_{uv} \sum_{k, ij \in k} f_{uv} p_k^{uv}, \text{ with } c_{ij} > 0$$

Transport Constraints:

The transport constraints ensure that one loop-free data path form the sending note u to a receiving node v exists.

$$\sum_k p_k^{uv} = 1,$$

for all k possible paths from u to v

Capacity Constraints:

The sum over the flows on each link must be smaller then the capacity of the link $$\sum_{uv} \sum_{k, ij \in k} p_k^{uv} f_{uv} \leq a_c c_{ij},$$

for all data links ij with $c_{ij} > 0$ and also smaller than the maximum link utilization t $$\sum_{uv} \sum_{k, ij \in k} p_k^{uv} f_{uv} \leq \frac{t}{100} \cdot c_{ij},$$

for all data links ij with $c_{ij} > 0$

Routing Constraints:

If $p^{uv}$ define a path from u to v and $p^{kv}$ define a path for k to v and both paths are routing over i, both paths are identical for the path i to v, thus $$p^{uv} - p^{iv} < 1.$$

This routing constraints can be written as a recursive iteration over the index parameter k. E.g. a path from u to v is routed over a, b and c. Thus, k is defined as k=u, a, b, c, v thus the flow from a to v must use the path a, b, c, v and also the flow from b to v must use the path b, c, v and so on. This recursive iteration is also true in the opposite direction of the index parameter k, e.g. k=u, a, b, c, v then also the flow from u to c must use the path u, a, b, c and so on.

Specification of the Link Costs

In order to specify the data link costs for the routing determined by the equation system or the reduced equation system, the data link costs have to be determined such that the found routing and the optimized data path, respectively, corresponds with the shortest path routing. By the way of example, this can be achieved as follows:

1. Additional Constraints:

To obtain the link costs as part of the solution of the first linear program, the following additional constraints have to be subjoined to the linear program:

$$L_k^{uv} = \sum_{ij \in k} I_{ij}$$

The additional variable $I_{ij}$ specifies the interface or link cost value of the link between i to j, whereas $L_k^{uv}$ defines the overall cost of the $k^{th}$ path from u to v.

$$L_k^{uv} - L_s^{uv} \geq (p_s^{uv} - 1) * i_{max}$$

This inequality guaranties that, if path s is chosen as the shortest path, the path s has the smallest overall cost value from u to v. If path s is chosen as the shortest path then $p_s^{uv}=1$ and thus the inequality $L_k^{uv}-L_s^{uv} \geq 0$ has to be fulfilled. Otherwise the difference between $L_k^{uv}-L_s^{uv}$ must be greater than $-i_{max}$.

$$1 \leq I_{ij} \leq i_{max}$$

The cost value of the link or interface should be between 1 and a value $i_{max}$. $i_{max}$ determines the maximum cost value for a link or an interface. For example, $i_{max}$ is set to the maximum value specified in the routing protocol (e.g. for OSPF $i_{max}$ is 65535) for the link or interface cost value. To save calculation time it is also possible to choose a smaller value, for example on the basis of the following rule of thumb:

$i_{max}=4n$ for a network having $n$ routers.

It is not necessary to modify the objective function. But, to minimize the cost values the additional term $$a_g \sum_{ij} I_{ij}$$

can be added to the objective function. $a_g$ defines the importance of this term in the objective function and may be choosen (much) smaller than 1.

2. Equation System for a Linear Optimization Problem:

A further possibility is the specification of the link costs by an equation system for a linear optimization problem. In this case, the objective function is rather unimportant since the desired solution for the data link costs is obtained by computing an inequality system. A linear optimization problem is represented by an inequality system in combination with an objective function. Therefore, the determination of the interface costs can be calculated using an equation system for a linear optimization problem. As a result, a standard solver for linear optimization problems can be used for the determination of the data link costs.

The variable $m_{ij}$ represents the cost of interface ij. The shortest path from u to v is the path with the least cost. The path cost is the sum of the cost values of the single interfaces. For the flow from u to v the cost $m^{uv}$ is given by $$m^{uv} = \sum_{ij} m_{ij} x_{ij}^{uv}$$

where $x_{ij}^{uv}$ describe the paths of the previous routing optimization. $m^{uv}$ has to be the minimum cost of all possible paths from u to v. Therefore, for each loop free path p other than the optimized path $p_{opt}^{uv}$, a constraint has to be specified that forces the cost of $p_{opt}^{uv}$ to be the smaller one:

$$\sum_{ij} x_{ij}^{uv} m_{ij} < \sum_{ij, \delta_{ij}(p) = 1} m_{ij}$$

To include all such constraints for all paths would lead to a very complex problem for larger networks. However, not all of these constraints are required to obtain a suitable solution. For a flow from u to v the mandatory constraints are identified by the following algorithm:

Consider each neighbor router i of u:

if $p_{opt}^{uv}$ and $p_{opt}^{iv}$ have no common node except v, add the constraint:

$$\sum_{st} x_{st}^{uv} m_{st} < m_{ui} + \sum_{st} x_{st}^{iv} m_{st} \qquad (12)$$

else add no constraint.

The algorithm is explained using the example of FIG. 13. Every path from u to v runs over a neighbor router of u. In the example the three neighbors of u are i, j, and additionally the first router of $p_{opt}^{uv}$. Three types of paths exist between a router n, which is adjacent to u, and v:

- Optimize path $p_{opt}^{nv}$ without a node in common with $p_{opt}^{uv}$, in the example (FIG. 13) the solid gray line between i and v.
- Optimize path $p_{opt}^{nv}$ with a node in common with $p_{opt}^{uv}$, in the example (FIG. 13) the solid gray line between j and v.
- A non-optimal path from n to v, in the example the dashed gray line.

Following the above algorithm a constraint is necessary only for the path including $p_{opt}^{iv}$. The constraints concerning the other paths are already fulfilled by the constraints of other flows.

In the case of the path $p_g$, indicated by the dashed gray line between i and v, the constraint $$\sum_{ij} x_{st}^{iv} m_{st} < \sum_{st, \delta_{st}(p_g) = 1} m_{st}$$

already exists when flow form i to v is considered. This constraint together with equation 12 implies that the cost of the path using $p_g$ is larger than the cost of $p_{opt}^{uv}$.

Considering the path between j and v, the part between k and v is common with $p_{opt}^{uv}$. According to the routing principles we know that the shortest path from u to k is routed along the black line. For this flow from u to k the constraint exists that the path along the black line $p_{opt}^{uk}$ has to be shorter than the path over j and then along the gray line. But this constraint implies that $p_{opt}^{uv}$ is shorter than the path over j and then along the gray line.

If the solution of such an inequality system shows that for all data paths except the desired/optimum data path the sum of the data link costs of the data paths is larger than the sum of the link costs of the desired/optimum data path, the desired/optimum data path is corresponding with the shortest data path.

Examples

To demonstrate the effect of the method according to the invention, the results of an optimized routing for example networks is described in the following. The used networks are shown in FIG. 4. The network on the right of FIG. 4 with only 6 nodes/routers was chosen because its size allows to illustrate the resulting paths. The networks having 8 and 14 nodes/routers were selected because of their complex structure which makes many different data paths possible. As example, the link capacity matrix C and the data flow matrix F for the network having 6 nodes/routers is shown in tables 1 and 2.

TABLE 1

Capacity matrix C for the network having 6 nodes/routers

|   | 0 | 1 | 2 | 3 | 4 | 5 |
|---|---|---|---|---|---|---|
| 0 | 0 | 120 | 0 | 100 | 0 | 0 |
| 1 | 110 | 0 | 80 | 0 | 0 | 0 |
| 2 | 0 | 90 | 0 | 100 | 0 | 70 |
| 3 | 130 | 0 | 80 | 0 | 90 | 0 |
| 4 | 0 | 0 | 0 | 70 | 0 | 120 |
| 5 | 0 | 0 | 75 | 0 | 125 | 0 |

TABLE 2

Flow matrix F for the network having 6 nodes/routers

|   | 0 | 1 | 2 | 3 | 4 | 5 |
|---|---|---|---|---|---|---|
| 0 | 0 | 5 | 6 | 7 | 4 | 7 |
| 1 | 4 | 0 | 6 | 4 | 8 | 5 |
| 2 | 6 | 8 | 0 | 4 | 6 | 4 |
| 3 | 8 | 9 | 4 | 0 | 5 | 6 |
| 4 | 5 | 7 | 8 | 5 | 0 | 3 |
| 5 | 5 | 7 | 6 | 8 | 4 | 0 |

The physical delays of the different data links were set to 1, while the parameter ar was set to 3 in every optimization. Using the above described pre-solver, for example, the number of variables for the network having 14 nodes/routers was reduced from a value of 8800 to a value of 4714. Moreover, the number of constraints could be reduced to less than the half.

For all networks, optimizations with several parameter settings were performed. First the optimization was performed without an effective upper threshold for the maximum link utilization. This was achieved by omitting the constraints keeping the maximum link utilization below the value of the parameter t (as described in section "Sub-optimal optimization") and by setting the parameter $a_c$ to a value of 10. The resulting routing for the network having 6 nodes/routers is illustrated in FIG. 5. The data link having the highest utilization of 42.9% is the data link 4-3. The value for the minimized average link utilization was calculated to 22.4%.

Then, the parameter $a_c$ was set to a value of 0.4 (=40%) being slightly smaller than the calculated maximum link utilization of 42.9%. Iteratively reducing the parameter $a_c$, namely to values of 0.375 (=37.5%) and 0.36 (=36%), the optimum routing was found for the parameter $a_c$ having the value of 0.36 which corresponds with the result of the default optimization.

In the default optimization, using the objective function (1), the parameter at was set to a value of 1000. The result of this optimization for the network having 6 nodes/routers is illustrated in FIG. 6. Again, the most utilized data link is the data link 4-3, however, its utilization was decreased to a value of 35.7%. As a compensation, the average link utilization was increased to a value of 22.70%.

As shown in FIGS. 5 and 6, the data flow 5-0 was taken away from data link 4-3 and routed over nodes/routers 2 and 1. Therefore, the data path for the data flow 2-0 was also routed over node/router 1. Further, data flow 2-4 was routed over node/router 5 instead over node/router 3, in order to reduce the link utilization of data link 3-4 from a value of 40% to a value of 35.7%.

On the basis of the above described determination of data link costs, the data link costs as small as possible were specified such that the shortest path routing is equivalent to the routing defined by the above optimization. FIGS. 7 and 8 illustrate the calculated data link costs wherein the respective data link costs and the respective physical delays are drawn in the gray boxes. As shown in FIG. 7, the overall data link costs for data flow 5-0 is 3. Other possible data paths for data flow 5-0 include nodes/routers 2 and 1 or nodes/routers 2 and 3. The overall physical delay for these paths are 5 and 4, respectively. The shortest path is the same as the desired path having a minimized average link utilization.

In FIG. 8, based on an optimization with respect to a minimized maximum link utilization, the physical delay for the data path of data flow 5-0 is 3, also. The physical delays of the other possible data paths over nodes/routers 4 and 3 or over nodes/routers 2 and 3 are 4 and 6, respectively. Again, the shortest data path is corresponding with the desired/optimum data path.

The optimizations of data routings for the networks having 8 and 14 nodes/routers was performed similarly. First, the average link utilization was minimized without restriction for the maximum link utilization. Then, the maximum link utilization was decreased iteratively. At the end, the optimization was performed to obtain the minimal possible maximum link utilization. However, the network having 14 nodes/routers proves to be complex to obtain an optimal solution. The maximum link utilization was reduced to 38.8%, while the minimal value for the maximum link utilization is not known. However, the minimal link utilization has to be greater than a value of 32%, since for this value the equation system for the linear optimization problem proved to be infeasible.

In FIGS. 9 and 10, the results for the routing optimizations with selected upper thresholds for the maximum link utilizations for the networks having 8 and 14 nodes/routers are shown. The maximum link utilization could be decreased, while the average link utilization almost remains unchanged. As represented by the bars identifying the difference between link utilizations of the most and the least utilized data links, the data traffic distribution becomes more homogeneous with a stricter upper threshold of the maximum link utilizations. In particular, the difference could be reduced to almost a quarter of the network having 8 nodes/routers (see FIG. 9). For the network having 14 nodes/routers, the optimization effect is less clear since in this network links are existing with an utilization of only about 1% independent of the selected upper threshold for the maximum link utilization (see FIG. 10).

Since the optimization results in a reduction of the highest value for the maximum link utilization, link utilization of specific links have to be increased as a compensation. As illustrated in FIG. 11, the link utilization of selected data links is shown for different upper thresholds for the maximum link utilization. The link utilization of data links initially highly utilized is decreased for a reduction of the upper threshold for the maximum link utilization. This applies for example for data links 9-4, 4-9 and 4-2. In consequence, the link utilization of data links 8-5, 5-8 and 3-1 is increased.

Measure the End-to-End matrix (e.g. SNMP, Accounting/Billing Software) and collect the data on a central system (INTERNET-server)↓

Build from the collected data the capacity, flow, delay matrix↓

Use the method to calculate the optimal routing parameter. ↓

Configure the router with the optimal parameter over the router configure software.

For smaller networks it's possible to collect the needed information to build the matrixes with the routing protocol (e.g. change the routing protocol or use a extra protocol) and calculate the optimal routing parameters in every router. In this case no central unit is needed.

FIG. 14 is a flowchart illustrating a process 1400 by which data traffic is controlled in a network having a plurality of nodes connected via data links, in accordance with an embodiment of the present invention, in accordance with an embodiment of the present invention.

Note that the steps in the flowchart do not necessarily have to occur in the order shown. FIG. 14 is described with reference to the embodiments illustrated in FIGS. 1, 3, 5-8, and 12. However, FIG. 14 is not limited to those embodiments.

The method begins at step 1410 where all loop-free data paths between a sending node and a receiving node are determined. In an embodiment, the sending node and receiving node are distinct nodes in a network having a plurality of nodes connected via data links, such as the network depicted in FIG. 3. In one embodiment, loop-free data paths between a sending node and a receiving node are determined in this step, wherein each loop-free data path comprises a concatenation of one or more data links, such as the loop-free paths depicted in FIGS. 3 and 12. After all loop-free data paths are determined, control is passed to step 1420.

In step 1420, loop-free data paths are selected such that all communication between the sending and receiving nodes is communicated via the same data path. In another embodiment, all data between a sending node and a receiving node is routed on the same loop-free network path, such as the network paths depicted in FIGS. 1 and 3. After the loop-free data paths are selected, control is passed to step 1430.

In step 1430, link costs for each data path selected in step 1420 are calculated using a linear optimization technique. In another embodiment of the present invention, the link costs are determined in this step in order to achieve uniform and homogeneous distribution of data traffic over data links of the network. In accordance with another embodiment of the invention, the linear optimization technique used in step 1430 to calculate link costs attempts to utilize the data links of the network equally as depicted in FIGS. 5-8. After the link costs are calculated, control is passed to step 1430.

In step 1440, one of data paths selected in step 1430 having minimal link costs is selected as an optimum data path. In accordance with another embodiment of the invention, a function can be used in step 1440 to determine minimal link costs, wherein the function represents the average link utilization and/or the maximum link utilization and/or the link costs. After the optimum data path is selected, control is passed to step 1440.

In step 1450, the optimum data path selected in step 1440 is used to communicate data between the sending node and the receiving node.

In step 1460, the process 1400 for controlling data traffic in a network ends.

The invention claimed is:

1. A method for controlling data traffic in a network having a plurality of nodes connected via data links, comprising:

determining all loop-free data paths between a sending node and a receiving node, the loop-free data paths comprising a concatenation of one or more data links connecting the sending node to the receiving node via one or more of the plurality of nodes;

selecting loop-free data paths such that data traffic communicated between the sending node and the receiving node is communicated via the same loop-free data path;

calculating link costs for the selected loop-free data paths using a linear optimization technique for determining uniform and homogeneous distribution of data traffic over data links of the network, wherein, in calculating link costs, the linear optimization technique attempts to distribute traffic equally over the data links of the network;

defining one of the selected loop-free data paths having minimal link costs as an optimum data path; and communicating data traffic between the sending node and the receiving node via the optimum data path.

2. The method according to claim 1, wherein the defining comprises setting cost constraints for all selected loop-free data paths other than the optimum loop-free data path such that the link costs of the optimum loop-free data path are set to be smaller than the link costs of other selected loop-free data paths.

3. The method according to claim 1, wherein the defining comprises defining cost constraints for those of the selected loop-free data paths other than the optimum loop-free data path which start from a node neighboring the sending node of the optimum loop-free data path and ending at the receiving node of the optimum data path, and which do not include further nodes of the optimum loop-free data path.

4. The method according to claim 1, wherein the calculating link costs is performed for a predefined or maximal amount of data traffic to be communicated.

5. The method according to claim 1, further comprising determining the link costs only for the data links that include different nodes of the network.

6. The method according to claim 1, wherein the defining one of the selected loop-free data paths as an optimum data path is performed separately for at least two parts of the network.

7. A method for transferring data across a network comprising:

determining candidate loop-free data paths between first and second nodes on the network, wherein the determining comprises selecting data paths that comply with predetermined transport constraints, and wherein the predetermined transport constraints comprise:

routing data from the first node to the second node via a third node over a data link leading out of the third node;

routing data from the first node to the second node over a data link from the first node to the third node; and routing data from the first node to the second node over a data link leading into the second node;

calculating link utilization information of links within the candidate loop-free data paths, wherein the calculating comprises minimizing a cost equation that includes one or more optimization variables of maximum link utilizations and average link utilizations;

selecting an optimum data path from one of the candidate loop-free data paths based on the link utilization information, wherein selection of the optimum data path attempts to utilize the data links of the network equally; and transferring data between the first and second nodes on the selected optimum data path.

8. The method according to claim 7, wherein the predetermined transport constraints further comprise:
  determining data capacity information of links within the candidate loop-free data paths; and
  selecting data paths having a data communication capacity equal to or greater than a predetermined data capacity constraint.

9. The method according to claim 7, wherein the predetermined transport constraints further comprise routing data flow to ensure that all data to be communicated between the first and second nodes are communicated via the same data path.

10. The method according to claim 7, wherein the selecting an optimum data path comprises selecting data links having a predefined range of link costs.

11. The method according to claim 7, wherein the predetermined transport constraints further comprise:
  determining a time duration required for transferring a first amount of data between the first node and the second node for the loop-free data path; and
  selecting data paths having a data transferring time duration below a predefined time limit.

12. A method for transferring data across a network comprising:
  determining candidate loop-free data paths between first and second nodes on the network to ensure loop-free data paths, wherein the candidate loop-free data paths comprise links connecting the first node to the second node via one or more of a plurality of nodes in the network;
  calculating link utilization information of the links within the candidate loop-free data paths, wherein the calculating comprises minimizing a cost equation that includes one or more optimization variables of maximum link utilizations and average link utilizations, and wherein the link utilization information includes one or more variables representative of maximum link utilizations, average link utilizations, costs of the links within the candidate loop-free data paths, or a combination thereof;
  selecting an optimum data path from one of the candidate loop-free data paths based on the link utilization information, wherein selection of the optimum data path attempts to distribute traffic equally over the data links of the network; and
  transferring data between the first and second nodes on the selected optimum data path.

13. A method for transferring data across a network comprising:
  determining candidate loop-free data paths between first and second nodes on the network, wherein the candidate loop-free data paths comprise links connecting the first node to the second node via one or more of a plurality of nodes in the network, and wherein the determining comprises selecting data paths having physical delays equal to or smaller than a predetermined physical delay constraint, and wherein the physical delay constraint is defined by predefined data communication times for the data links between the nodes of the network;
  calculating link utilization information of the links within the candidate loop-free data paths;
  selecting an optimum data path from one of the candidate loop-free data paths based on the link utilization information, wherein selection of the optimum data path attempts to distribute traffic equally over the data links of the network; and
  transferring data between the first and second nodes on the selected optimum data path.

14. A system for transferring data across a network comprising:
  a control unit configured to determine candidate loop-free data paths between first and second nodes on the network, wherein the candidate loop-free data paths comprise links connecting the first node to the second node via one or more of a plurality of nodes in the network;
  means for calculating link utilization information of the links within the candidate loop-free data paths, wherein the link utilization information includes one or more variables representative of maximum link utilizations, average link utilizations, costs of the links, or a combination thereof, and wherein the means for calculating comprises means for minimizing a cost equation that includes one or more optimization variables of maximum link utilizations and average link utilizations;
  means for selecting an optimum data path from one of the candidate loop-free data paths based on the link utilization information, wherein selection of the optimum data path attempts to utilize the links of the network equally; and
  means for transferring data between the first and second nodes on the selected optimum data path.

15. The system according to claim 14, wherein the means for determining candidate loop-free data paths comprises means for selecting data paths having a data communication capacity equal to or greater than a predetermined data capacity constraint.

16. The system according to claim 14, wherein the means for determining candidate loop-free data paths comprises means for selecting data paths having physical delays equal to or smaller than a predetermined physical delay constraint.

17. The system according to claim 14, wherein the means for determining candidate loop-free data paths comprises: means for selecting data paths that comply with predetermined transport constraints to ensure a loop-free data path.

18. The system according to claim 14, wherein the means for selecting the optimum data path comprises means for selecting data paths having a predefined range of link costs.

19. A method for controlling data traffic in a network having a plurality of nodes connected via data links, comprising:
  determining all loop-free data paths between a sending node and a receiving node, wherein the loop-free data paths comprise a concatenation of one or more data links connecting the sending node to the receiving node via one or more of a plurality of nodes within the network;
  calculating link costs for the loop-free data paths, wherein link costs are at least based on a linear optimization technique for determining distribution of data traffic uniformly and homogeneously amongst data links in the network;
  selecting one of the loop-free data paths having the minimal link costs; and
  communicating data traffic between the sending node and the receiving node via the selected loop-free data path.

20. The method according to claim 19, wherein the calculating further comprises:
  determining data capacities of the loop-free data paths and selecting loop-free data paths having data capacities sufficient to communicate the data traffic between the sending node and the receiving node.

21. The method according to claim 20, wherein the calculating further comprises:

determining physical delays associated with the loop-free data paths; and selecting loop-free data paths having physical delays equal or smaller than a predetermined physical delay.

22. The method according to claim 19, wherein the calculating further comprises:
defining an equation system for the linear optimization technique for identifying link costs for the loop-free data paths; and
solving the equation system to define the loop-free data path having the lowest cost.

23. The method according to claim 22, wherein defining the equation system comprises:
defining an objective function including a term representing the link costs.

24. The method according to claim 23, wherein defining the equation system further comprises:
defining an objective function, wherein the function includes one or more of: terms representing maximum link utilization, terms representing average link utilization, values indicating combinations of maximum link utilizations and average link utilizations, and link costs.

25. The method according to claim 24, wherein defining the equation system further comprises:
defining cost constraints for the link costs of each of the selected loop-free data paths.

26. The method according to claim 25, wherein defining the equation system further comprises:
defining transport constraints for data flow conservation and average link utilization as a part of the determining the loop-free data paths.

27. The method according claim 26, wherein the solution of the equation system is determined within a received, predefined, tunable time interval, and wherein the solution identifies the optimum loop-free data path if the current equation system cannot be solved, or if no minimum is determined for the objective function, or the objective function does not converge.

28. The method according to claim 27, wherein the number of variables of the equation system is reduced and loop-free data links are determined to be considered for the solution of the equation system by determining the time for data communication for all loop-free data paths from the sending node to the receiving node, and/or loop-free data links are determined to be considered for the solution of the equation system by determining the sum of link costs for all loop-free data paths from the sending node to the receiving node;
identifying loop-free data paths for which a minimum data communication time and a data communication time being smaller than an inputted, predefined maximum data communication time are determined; and
identifying loop-free data paths having a sum of link costs smaller than an inputted, predefined maximum cost.

29. The method according to claim 28, wherein data links being included by all possible loop-free data paths are considered for the solution of the equation system; and
data links not being included by any of the possible loop-free data paths are not considered for the solution of the equation system.

30. The method according to claim 19, wherein the calculating is performed on the basis of a linear optimization problem.

31. The method according to claim 30, wherein the calculating is achieved by computing an inequality system for the linear optimization problem; and
a loop-free data path of the selected loop-free data paths having a sum of link costs being larger compared to sums of link costs for remaining loop-free data paths is selected as the optimum loop-free data path.

32. The method according to claim 31, wherein cost constraints are defined for those of the selected data paths other than the optimum data path which start from a node neighboring the sending node of the optimum loop-free data path and end at the receiving node of the optimum loop-free data path, and wherein the selected data paths do not include further nodes of the optimum loop-free data path, and wherein no cost constraints are defined for the remaining of the selected data paths other than the optimum data path.

33. The method according to claim 31, wherein the link costs are determined only for data links including different nodes of the network.

34. The method according to claim 31 wherein the identification of the optimum data path is performed separately for at least two parts of the network.

35. The method according to claim 31 wherein at least one part of the network is grouped to a virtual node and the optimum data path in the remaining portion of the network including the virtual node and the optimum data path in the grouped part of the network are identified separately.

36. The method according to claim 19 wherein the nodes are one or more of computers, servers, and processors.

37. The method according to claim 19 wherein the data links are comprised of one or more of optical fibers, electrical wires, busses, data stored in intermediate memories of nodes, and data packages stored in intermediate memories of nodes.

38. The method according to claim 19 wherein the data links are comprised of one or more of electrical wires, busses, data, and data packages stored in intermediate memories of routers.

39. The method according to claim 19 wherein the data traffic includes one or more of data packets, voice over internet protocol (VOIP) packets, electronic documents, electronic files, data packet streams, email messages, streaming audio, streaming video, streaming multimedia, images, executable code, audio files, databases, database tables, database table records, collections of electronic files; collections of electronic documents, stored passwords, stored ciphers, public encryption keys, private encryption keys, multimedia files, image data, and other data traffic capable of being transmitted via packet switched data networks.

40. In a network having a plurality of nodes connected by data links wherein at least one of the nodes is a sending node and at least one of the nodes is a receiving node, a system for controlling data traffic in the network, the system comprising:
a controller connected to the network for controlling data traffic in the network, wherein the controller is configured to:
determine all loop-free data paths between a sending node and a receiving node, wherein the loop-free data paths comprise a concatenation of one or more data links connecting the sending node to the receiving node via one or more routers and nodes within the network;
calculate link costs for the loop-free data paths, wherein link costs are at least based on a linear optimization technique for determining distribution of data traffic uniformly and homogeneously amongst data links in the network;
select one of the loop-free data paths having the minimal link costs, and
communicate data traffic between the sending node and the receiving node via the selected loop-free data path.

41. A method for controlling data traffic in a network having a plurality of nodes connected via data links, comprising:

determining all loop-free data paths between a sending node and a receiving node, wherein the loop-free data paths comprise a concatenation of one or more data links connecting one or more of the plurality of nodes within the network;

calculating link costs for the loop-free data paths, wherein link costs are at least based on a linear optimization technique for determining distribution of data traffic uniformly and homogeneously amongst data links in the network, wherein link costs for the loop-free data paths are identified by defining an equation system for the linear optimization technique and solving the equation system to define the loop-free data path having the lowest cost, wherein defining the equation system comprises:

defining an objective function including a term representing the link costs;

defining an objective function, wherein the function includes one or more of:

terms representing maximum link utilization;

terms representing average link utilization;

values indicating combinations of maximum link utilizations and average link utilizations; and link costs, wherein the combination of the average link utilization, the maximum link utilization, and the link costs is represented by a function, and wherein the function includes the average link utilization, the maximum link utilization, and the link costs weighted with respect to each other;

defining cost constraints for the link costs of each of the selected loop-free data paths;

defining transport constraints for data traffic conservation and average link utilization as a part of the determining the loop-free data paths;

defining routing constraints, wherein the routing constraints ensure that all data traffic to be communicated between two nodes are communicated via the same loop-free data path; and defining physical delay constraints for determining the loop-free data paths having physical delays for respective data links, wherein the physical delays are less than a predetermined maximum physical delay;

wherein solving the equation system comprises:

minimizing the objective function regarding the constraints for determining all possible loop-free data paths, and defining the loop-free data path having the minimal link costs as the optimum loop-free data path; and wherein the solution of the equation system is determined within a predefined, tunable time interval, and wherein the solution identifies the optimum loop-free data path if the current equation system cannot be solved, or if no minimum is determined for the objective function, or the objective function does not converge;

selecting one of the loop-free data paths having the minimal link costs, wherein loop-free data paths of the selected loop-free data paths having link costs in a predefined range are considered for the selection of the optimum loop-free data path; and communicating data traffic between the sending node and the receiving node via the selected loop-free data path.

42. The method according to claim 41, wherein the number of variables of the equation system is reduced and loop-free data links are determined to be considered for the solution of the equation system by determining the time for communicating data traffic for all loop-free data paths from the sending node to the receiving node; and identifying loop-free data paths for which a minimum data communication time and a data communication time being smaller than a predefined maximum data traffic communication time are determined.

43. The method according to claim 42, wherein data links being included by all possible loop-free data paths are considered for the solution of the equation system; and data links not being included by any of the possible loop-free data paths are not considered for the solution of the equation system.

44. The method according to claim 43, wherein calculating link costs is performed on the basis of a linear optimization problem, and wherein calculating link costs is achieved by computing an inequality system for the linear optimization problem; and a loop-free data path of the selected loop-free data paths having a sum of link costs being larger compared to sums of link costs for remaining loop-free data paths is selected as the optimum loop-free data path.

45. The method according to claim 44, wherein cost constraints are defined for those of the selected data paths other than the optimum data path which start from a node neighboring the sending node of the optimum loop-free data path and end at the receiving node of the optimum loop-free data path, and wherein the selected data paths do not include further nodes of the optimum loop-free data path, and wherein no cost constraints are defined for the remaining of the selected data paths other than the optimum data path.

46. The method according to claim 44, wherein the link costs are determined only for data links including different nodes of the network.

47. The method according to claim 44, wherein the identification of the optimum data path is performed separately for at least two parts of the network.

48. The method according to claim 44, wherein at least one part of the network is grouped to a virtual node and the optimum data path in the remaining portion of the network including the virtual node and the optimum data path in the grouped part of the network are identified separately.

49. A system for transferring data across a network comprising:

a control unit configured to determine candidate loop-free data paths between first and second nodes on the network wherein the candidate loop-free data paths comprise links connecting the first node to the second node via one or more of a plurality of nodes in the network;

wherein the control unit comprises:

a module configured to calculate link utilization information of the links within the candidate loop-free data paths, wherein the link utilization information includes one or more variables representative of maximum link utilizations, average link utilizations, costs of the links, or a combination thereof, and wherein the means for calculating comprises means for minimizing a cost equation that includes one or more optimization variables of maximum link utilizations and average link utilizations;

a module configured to select an optimum data path from one of the candidate loop-free data paths based on the link utilization information, wherein selection of the optimum data path attempts to distribute traffic equally over the data links of the network; and a module configured to transfer data between the first and second nodes on the selected optimum data path.

50. The system according to claim 49, wherein the control unit further comprises:

a module configured to select data paths having a data communication capacity equal to or greater than a predetermined data capacity constraint.

51. The system according to claim 49, wherein the control unit further comprises:

a module configured to select data paths having physical delays equal to or smaller than a predetermined physical delay constraint.

52. The system according to claim 49, wherein the control unit further comprises:

a module configured to select data paths that comply with predetermined transport constraints to ensure a loop-free data path.

53. The system according to claim 49, wherein the module configured to select an optimum data path further comprises:

a module configured to select data paths having a predefined range of link costs.

* * * * *

UNITED STATES PATENT AND TRADEMARK OFFICE
CERTIFICATE OF CORRECTION

| | | |
|---|---|---|
| PATENT NO. | : 7,869,359 B2 | Page 1 of 1 |
| APPLICATION NO. | : 10/221427 | |
| DATED | : January 11, 2011 | |
| INVENTOR(S) | : Kohler et al. | |

It is certified that error appears in the above-identified patent and that said Letters Patent is hereby corrected as shown below:

Column 22, line 36, in Claim 17, delete "comprises:" and insert -- comprises --.

Column 23, line 25, in Claim 25, delete "of each of" and insert -- of --.

Column 25, line 30, in Claim 41, delete "of each of" and insert -- of --.

Signed and Sealed this
Twenty-fourth Day of May, 2011

David J. Kappos
*Director of the United States Patent and Trademark Office*